US007013086B2

(12) United States Patent
Bischoff

(10) Patent No.: US 7,013,086 B2
(45) Date of Patent: Mar. 14, 2006

(54) ACCESS NODE FOR OPTICAL NETWORKS WITH VARIABLE-ACCESS WAVELENGTHS, USER DEVICE FOR CONNECTION TO SUCH AN ACCESS NODE, METHOD FOR FEEDING A NUMBER OF SIGNALS FROM A NUMBER OF USERS INTO AN OPTICAL NETWORK AND USING AN ACCESS NODE AND AT LEAST ONE USER DEVICE FOR CARRYING OUT SUCH A METHOD

(75) Inventor: Mathias Bischoff, München (DE)

(73) Assignee: Siemens Aktiengesellschaft, Munich (DE)

( * ) Notice: Subject to any disclaimer, the term of this patent is extended or adjusted under 35 U.S.C. 154(b) by 593 days.

(21) Appl. No.: 09/775,040

(22) Filed: Feb. 1, 2001

(65) Prior Publication Data

US 2001/0013963 A1   Aug. 16, 2001

(30) Foreign Application Priority Data

Feb. 1, 2000   (DE) ............................... 100 04 290

(51) Int. Cl.
*H04J 14/02*   (2006.01)
(52) U.S. Cl. .............................. 398/89; 398/79; 398/59; 398/82; 398/83; 398/9; 398/45; 398/50; 398/48; 398/91; 398/100; 398/56; 398/58; 398/182; 398/183; 398/78

(58) Field of Classification Search ................. 398/59, 398/82, 83, 9, 45, 50, 91, 79, 87, 95, 56, 398/182, 183, 196, 48, 100, 58, 89, 78
See application file for complete search history.

(56) References Cited

U.S. PATENT DOCUMENTS

| 5,717,795  | A  | * | 2/1998  | Sharma et al. ................. 385/24 |
| 5,870,216  | A  | * | 2/1999  | Brock et al. ................... 398/49 |
| 6,137,613  | A  | * | 10/2000 | Ushirozawa .................. 398/94 |
| 6,275,511  | B1 | * | 8/2001  | Pan et al. ....................... 372/6 |
| 6,285,479  | B1 | * | 9/2001  | Okazaki et al. ............... 398/56 |
| 6,535,313  | B1 | * | 3/2003  | Fatehi et al. ................. 398/101 |
| 6,626,590  | B1 | * | 9/2003  | Nagatsu et al. ............... 398/59 |

* cited by examiner

*Primary Examiner*—Hanh Phan
(74) *Attorney, Agent, or Firm*—Laurence A. Greenberg; Werner H. Stemer; Ralph E. Locher

(57) ABSTRACT

The access node for optical networks with variable access wavelengths can be connected to user devices via respective first optical conductors and can be connected to the optical network via second optical conductors. The novel access node has light sources which emit at the wavelengths defined in the optical network. The light of the light sources can be modulated in the user devices. This prevents that in each case a light source which must be able to emit light of a different wavelength in a dynamic optical network or the wavelengths of which must be subsequently converted must be arranged in the individual user devices. In addition, it also prevents circuit boards leading to a high logistical expenditure having to be provided in the user devices. Accordingly, according to the invention, it is possible to construct the individual user devices without light sources. This considerably simplifies their construction and the method of use.

19 Claims, 1 Drawing Sheet

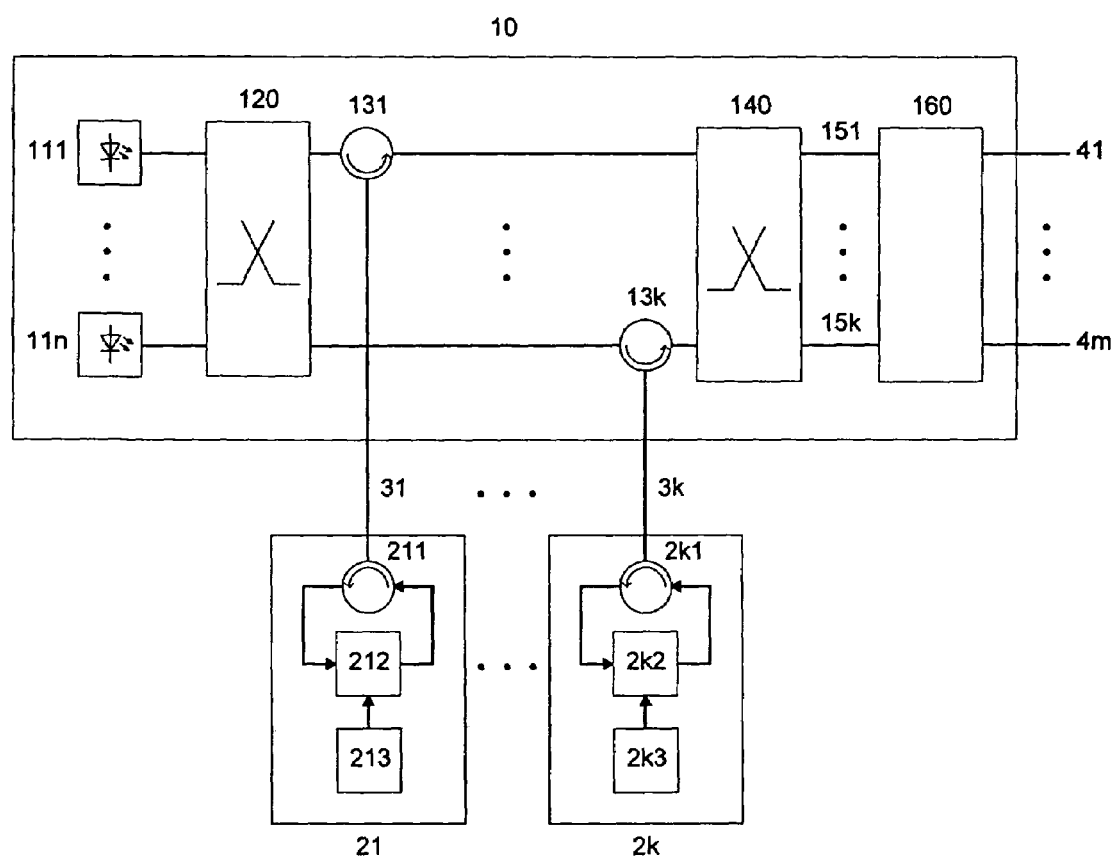

ACCESS NODE FOR OPTICAL NETWORKS WITH VARIABLE-ACCESS WAVELENGTHS, USER DEVICE FOR CONNECTION TO SUCH AN ACCESS NODE, METHOD FOR FEEDING A NUMBER OF SIGNALS FROM A NUMBER OF USERS INTO AN OPTICAL NETWORK AND USING AN ACCESS NODE AND AT LEAST ONE USER DEVICE FOR CARRYING OUT SUCH A METHOD

BACKGROUND OF THE INVENTION

Field of the Invention

The invention lies in the signal processing and communication fields. More specifically, the invention pertains to an access node for optical networks with variable access wavelengths, a user device for connection to such an access node, a method for feeding a number of signals from a number of users into an optical network, and the use of an access node and of at least one user device for performing such a method.

In wavelength division multiplex-based optical networks, the signals jointly conducted in a fiber must be modulated onto light of different wavelengths, the carrier frequencies. If such optical networks are accessed in optical signals, this prerequisite is achieved by the fact that the corresponding light sources are located in the individual devices of the users of the optical network. In the previously used methods, therefore, the user must know what wavelength is allocated to him in the optical network even before the connection is set up. The user must then send the signal with this corresponding wavelength. This leads to problems especially in highly dynamic optical networks where the connections are only switched semipermanently. This is because it is then not possible to guarantee that the same user is always allocated the same wavelength with each connection set-up. The consequence is that, in dynamic optical networks, the user must be capable of sending on every wavelength used in the optical network. This requires tuneable light sources, the wavelength of which can be changed. However, the development in the field of such tuneable light sources has not yet advanced to such an extent that satisfactory results can be achieved for practical use. Solutions are therefore required which manage with light sources which send on a fixed wavelength.

In the most widely used solution, transponders are used. These are devices which convert any input wavelengths to a fixed output wavelength and a signal is usually first converted to baseband and this signal is then remodulated onto the output wavelength. The result is that the user of the optical network can transmit on any wavelength. However, this prior art solution has the great disadvantage that every user requires his own transponder in the access node. As a result, access to the network is only made possible at the expense of considerable costs. In addition, there is the risk in this solution that the transponder degrades the signal quality. In particular, this is the case with embodiments which only amplify in the baseband or operate with limiters. Furthermore, there is the risk in these known solutions that not all signal formats can be processed. This is the case, in particular, with embodiments which perform a complete regeneration in the baseband.

As a more cost-effective alternative, it is known to equip the individual devices of the users with transmitters which transmit on the wavelength assigned to them in each case. However, this more cost-effective solution also has severe disadvantages. On the one hand, the circuit cards of each device operated on the network must be produced and stored in all wavelength models used. This leads to great logistical expenditure. On the other hand, this results in the disadvantage that with each new assignment of a wavelength in conjunction with a connection set-up or new connection set-up, the circuit boards must be exchanged. As a result, frequent exchange of boards becomes necessary, especially in highly dynamic optical networks. This immense effort is no longer tolerable.

SUMMARY OF THE INVENTION

The object of the present invention is to provide an access node for optical networks, a user device for connection to such an access node, and associated methods which overcome the above-noted deficiencies and disadvantages of the prior art devices and methods of this general kind.

With the above and other objects in view there is provided, in accordance with the invention, an access node for optical networks with variable access wavelengths, comprising:

a plurality of first optical conductors each disposed to connect a respective user device;

at least one second optical conductor for connecting the access node to an optical network; and a plurality of light sources emitting light signals at wavelengths of the optical network and connected to the first optical conductors such that the light signals of the light sources can be modulated in the user devices.

In other words, the access node according to the invention has light sources with the different wavelengths which are needed for the network arranged in the node itself and no longer in the individual user devices. As a result, it is not necessary to provide a transponder for each user in the access node. It is also not necessary to exchange circuit boards in the user devices since the respective wavelength is generated in the access node and is transmitted from there to the individual user devices. Furthermore, the operator of the optical network has full control of all light sources in his network by means of an access node according to the invention. The user is thus able easily to ensure constancy of frequencies and the power level of the light signals in his network. The spatial vicinity of the light sources also enables expensive monitoring devices such as, for example, optical spectrum analyzers to be divided among all sources.

In accordance with a preferred embodiment, the light sources are lasers or laser arrays.

In accordance with an added feature of the invention, optical coupling elements are disposed between the light sources and the first optical conductors. These may be circulators and/or directional couplers. In accordance with an additional feature of the invention, there is provided a first switching matrix between the light sources and the first optical conductors. The switching matrix is preferably capable of multicasting.

In accordance with another feature of the invention, a signal processing block with optical wavelength division multiplexers is connected between the first optical conductors and the second optical conductors. Furthermore, a second switching matrix may be disposed between the first optical conductors and the signal processing block. Also, the signal processing block may include at least one additional signal processing unit. The at least one additional signal processing unit may comprise a switching matrix, an optical switch, an optical amplifier, and/or an optical monitoring device.

In accordance with an alternative embodiment of the invention, the further switching matrix is combined with the second switching matrix.

With the above and other objects in view there is also provided, in accordance with the invention, a user device configured for connecting to the above-outlined access node. The user device comprises a second circulator and a modulator to be connected to an information source.

There is also provided, in accordance with the invention, a user device configured for connecting to the access node, the user device comprising a modulator operating in reflection mode and configured to be connected to an information source.

With the above and other objects in view there is furthermore provided, in accordance with the invention, a method of feeding a plurality of signals from a plurality of users into an optical network. The method comprises the following steps:

generating a number light signals of different wavelength in an access node (preferably an access node as defined above);

extracting the light signals from the access node and transmitting the light signals to a number user devices (preferably user devices as outlined above);

modulating the light signals with user signals in the user devices to form modulated light signals;

injecting the modulated light signals into the access node;

generating wavelength division multiplex signals in the access node; and feeding the wavelength division multiplex signals into the optical network.

In summary, in the method according to the invention for feeding a number of signals from a number of user devices into an optical network, it is no longer necessary, therefore, that the individual user devices according to the invention exhibit a light source which produces the carrier frequency needed for the optical network. In the individual user devices, only the information of the user is copied onto the carrier frequency coming from the access node by a modulation onto this carrier signal. After that, the modulated carrier signal is transmitted back to the access node and the latter then feeds it into the optical network.

Other features which are considered as characteristic for the invention are set forth in the appended claims.

Although the invention is illustrated and described herein as embodied in a access node for optical networks with variable-access wavelengths, user device for connection to such an access node, method for feeding a number of signals from a number of users into an optical network and using an access node and at least one user device for carrying out such a method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE shows a diagrammatic representation of an access node with user devices, which is connected to an optical network.

DESCRIPTION OF THE PREFERRED EMBODIMENTS

Referring now to the FIGURE of the drawing in detail, there is seen an optical access node 10 with a number n light sources 11.1–11.$n$. The number n is greater than or equal to the number of different wavelengths that are used in the optical network. The wavelengths of these light sources 11.1–11.$n$ are identical to the wavelengths used in the optical network. Due to the fact that the light sources are spatially close to one another, namely in the access node 10 and not with every user, laser arrays can be preferably used which are more cost-effective compared with single lasers and can already be manufactured with their emission wavelengths tuned to the channel pattern of the wavelength division multiplex. Using laser arrays in conjunction with transponders, which is conceivable, in principle, is not possible because of the excessive space requirement of the baseband electronics which in each case fill an entire board. This makes it necessary to equip each transponder board with a separate laser. Since the present invention dispenses with baseband electronics, there is no such restriction.

The light sources 11.1–11.$n$ are followed by a switching matrix 12. The switching matrix 12 is followed by a number k first circulators 13.1–13.$k$ which are arranged in parallel lines. The first circulators 13.1–13.$k$ are connected to the user devices 2.1–2.$k$ via k first optical conductors 3.1–3.$k$ which are brought out of the access node 10. Within the access node 10, a second switching matrix 14 follows the first circulators 13.1–13.$k$. The second switching matrix 14 is connected to a signal processing block 16 via k connections 15.1–15.$k$. Starting from the signal processing block 16, a number m second optical conductors 4.1–4.$m$ are brought out of the access node 10 for connection to the optical network.

The user devices 2.1–2.$k$ connected to the access node 10 via the first optical conductors 3.1–3.$k$ in each case exhibit a second circulator 21.1–21.$k$ and a modulator 22.1–22.$k$. The modulators 22.1–22.$k$ are in each case connected to an information source 23.1–23.$k$.

A method according to the invention for feeding a number of signals from a number of users into an optical network runs with the device described above, as follows:

The light sources 11.1–11.$n$ of the optical access node 10 generate light signals of different wavelength. This first step is indicated by the reference numeral 1 and the jagged arrow pointing to the light sources 11.1–11.$n$. The wavelengths are the wavelengths used in the optical network as described above. In the simplest case, the number n of light sources 11.1–11.$n$ corresponds exactly to the number of wavelengths of the wavelength division multiplex, i.e. the number of optical channels per optical conductor. The n unmodulated light signals from the light sources 11.1–11.$n$ are supplied to the first switching matrix 12. The first switching matrix 12 forwards these light signals to the k first circulators 13.1–13.$k$ in accordance with the allocation of individual wavelengths. At the circulators, the light signals are extracted (step 2) from the access node 10 via the first optical conductors 3.1–3.$k$. As a result, the light signals are conveyed (step 3) to the user devices 2.1–2.$k$.

In the individual user devices 2.1–2.$k$, the unmodulated light signals are forwarded via the second circulators 21.1–21.$k$ to the respective modulator 22.1–22.$k$. In the modulators 22.1–22.$k$, these light signals are modulated (step 4) according to the information which is forwarded from the information sources 23.1–23.$k$ to the modulators 22.1–22.$k$. In turn, the light signals, which are now modulated, are transmitted back into the access node 10 via the same first optical conductors 3.1–3.*k* which corresponds to an injection (step 5) into the access node 10. Instead of the second circulators 21.1–21.*k* and the modulators 22.1–22.*k*, modulators operating in the reflection mode can also be used.

Accordingly, unmodulated light signals pass out of the first optical conductors 3.1–3.*k* in the direction from the access node 10 to the individual user devices 2.1–2.*k* with the wavelengths assigned to the individual user devices 2.1–2.*k* and modulated lightwaves of the same wavelength pass in the direction from the user devices 2.1–2.*k* to the access node 10.

In the access node 10, the modulated lightwaves arriving from the user devices 2.1–2.*k* via the first optical conductors 3.1–3.*k* are forwarded to the second switching matrix 14 via the first circulators 13.1–13.*k*. Instead of first circulators 13.1–13.*k*, directional couplers can be used just as well. Preferably, directional couplers constructed as optical directional couplers are used. In the second switching matrix 14, the light signals are arranged in accordance with their wavelengths and forwarded to the signal processing block 16 for further processing via connections 15.1–15.*k*. The signal processing block 16 contains at least wavelength division multiplexers. However, it can also contain further switching matrices, optical switches, optical amplifiers, optical monitoring devices and/or other signal processing units. These are indicated by a dashed box 16'. If the signal processing block 16 contains another switching matrix, the latter is advantageously combined with the second switching matrix 14. In this case, connections 15.1–15.*k* are omitted. In the wavelength division multiplexers, wavelength division multiplex signals are generated (step 6).

The signal processing block 16 transmits the wavelength division multiplex signals produced in it to the second optical conductors 4.1–4.*m* which thus leads to them being fed (step 7) into the optical network. If only a single second optical conductor 4.1 connects the signal processing block 16 to the optical network, this is a terminal multiplexer, with two second optical conductors 4.1, 4.2 it is an add/drop multiplexer and with more than two second optical conductors 4.1–4.*m* it is an optical cross-connect. With more than one second optical conductor 4.1–4.*m*, there is the possibility of providing, instead of in each case a number m of light sources 11.1–11.*n* of one wavelength, a smaller number of light sources 11.1–11.*n* and to divide these light sources 11.1–11.*n* among a number of user devices 2.1–2.*k*. For this purpose, the first switching matrix 12 must be configured to be capable of multicasting. However, it is also possible just as well to provide more than m light sources 11.1–11.*n* for a wavelength in order to be able to have access to a redundant light source 11.1–11.*n* of the same wavelength in the event of a failure of a light source 11.1–11.*n*.

By using the device described above and the method described above, it is also possible without problems to monitor the second optical conductors 3.1–3.*k* by which the user devices 2.1–2.*k* are connected. Even if a power failure occurs in a user device 2.1–2.*k*, the passive second circulator 21.1–21.*k* operates and the modulator 22.1–22.*k* allows the light to pass unmodulated. This may result in slightly greater attenuation than in the operating case. However, the operator is capable of distinguishing between any interruption of one of the first optical conductors 3.1–3.*k* and a failure of one of the user devices 2.1–2.*k* due to the light signals transmitted back from the user devices 2.1–2.*k*.

I claim:

1. A method of feeding a plurality of signals from a plurality of users into an optical network, which comprises the following steps:
   providing an access node for optical networks with variable access wavelengths, including:
      a plurality of first optical conductors each disposed to connect a respective user device;
      at least one second optical conductor for connecting the access node to an optical network; and
      a plurality of light sources emitting unmodulated light signals at wavelengths of the optical network and connected to the first optical conductors for feeding the unmodulated light signals to the user devices such that the unmodulated light signals of the light sources can be modulated in the user devices;
   connecting a number of user devices each with a modulator to the access node;
   generating a number of light signals of different wavelength in the access node;
   extracting the light signals in unmodulated form from the access node and transmitting the unmodulated light signals to the user devices;
   modulating the light signals with user signals in the user devices to form modulated light signals;
   injecting the modulated light signals into the access node;
   generating wavelength division multiplex signals in the access node; and
   feeding the wavelength division multiplex signals into the optical network.

2. A method of feeding a plurality of signals from a plurality of users into an optical network, which comprises the following steps:
   generating a number of light signals of different wavelength in an access node for optical networks with variable access wavelengths, including:
      a plurality of first optical conductors each disposed to connect a respective user device;
      at least one second optical conductor for connecting the access node to an optical network; and
      a plurality of light sources emitting unmodulated light signals at wavelengths of the optical network and connected to the first optical conductors for feeding the unmodulated light signals to the user devices such that the unmodulated light signals of the light sources can be modulated in the user devices;
   extracting the light signals in unmodulated form from the access node and transmitting the unmodulated light signals to a number of user devices;
   modulating the light signals with user signals in the user devices to form modulated light signals;
   injecting the modulated light signals into the access node;
   generating wavelength division multiplex signals in the access node; and
   feeding the wavelength division multiplex signals into the optical network.

3. The method of claim 2, wherein said at least one second optical conductor is one of a plurality of optical conductors connecting the access node to the optical network.

4. The method of claim 2, wherein said light sources are lasers.

5. The method of claim 2, wherein said light sources are laser arrays.

6. The method of claim 2, which comprises optical coupling elements disposed between said light sources and said first optical conductors.

7. The method of claim 6, wherein said optical coupling elements are selected from the group consisting of first circulators and directional couplers.

8. The method of claim 2, which comprises a first switching matrix connected between said light sources and said first optical conductors.

9. The method of claim 8, wherein said first switching matrix is capable of multicasting.

10. The method of claim 2, which comprises a signal processing block with optical wavelength division multiplexers connected between said first optical conductors and said second optical conductors.

11. The method of claim 9, which comprises a signal block switching matrix disposed between said first optical conductors and said signal processing block.

12. The method of claim 11, which comprises a further switching matrix combined with said signal block switching matrix.

13. The method of claim 10, wherein said signal processing block includes at least one additional signal processing unit.

14. The method of claim 13, wherein said at least one additional signal processing unit is selected from the group consisting of a switching matrix, an optical switch, an optical amplifier, and an optical monitoring device.

15. A method of feeding a plurality of signals from a plurality of users into an optical network, which comprises the following steps:
generating a number of light signals of different wavelength in an access node for optical networks with variable access wavelengths, including:
a plurality of first optical conductors each disposed to connect a respective user device;
at least one second optical conductor for connecting the access node to an optical network; and
a plurality of light sources emitting unmodulated light signals at wavelengths of the optical network and connected to the first optical conductors for feeding the unmodulated light signals to the user devices such that the unmodulated light signals of the light sources can be modulated in the user devices;
extracting the light signals in unmodulated form from the access node and transmitting the unmodulated light signals to a number of user devices, the user devices including a circulator and a modulator to be connected to an information source;
modulating the unmodulated light signals with user signals in the user devices to form modulated light signals;
injecting the modulated light signals into the access node;
generating wavelength division multiplex signals in the access node; and
feeding the wavelength division multiplex signals into the optical network.

16. A method of feeding a plurality of signals from a plurality of users into an optical network, which comprises the following steps:
generating a number of light signals of different wavelength in an access node for optical networks with variable access wavelengths, including:
a plurality of first optical conductors each disposed to connect a respective user device;
at least one second optical conductor for connecting the access node to an optical network; and
a plurality of light sources emitting unmodulated light signals at wavelengths of the optical network and connected to the first optical conductors for feeding the unmodulated light signals to the user devices such that the unmodulated light signals of the light sources can be modulated in the user devices;
extracting the light signals in unmodulated form from the access node and transmitting the unmodulated light signals to a number of user devices, the user devices including a modulator operating in reflection mode and configured to be connected to an information source;
modulating the unmodulated light signals with user signals in the user devices to form modulated light signals;
injecting the modulated light signals into the access node;
generating wavelength division multiplex signals in the access node; and
feeding the wavelength division multiplex signals into the optical network.

17. An optical network with variable access wavelengths, comprising:
an access node;
a number of user devices, each of said number of user devices for modulating light signals with user signals to form modulated light signals;
a plurality of first optical conductors each disposed to connect a respective one of said number of user devices to said access node;
said access node including a plurality of light sources for generating a number of light signals of different wavelengths, said plurality of light sources emitting unmodulated light signals at wavelengths of the optical network and feeding the unmodulated light signals to said number of user devices, via said first optical conductors, such that the unmodulated light signals of said light sources can be modulated in the user devices;
said plurality of first optical conductors for extracting the light signals in unmodulated form from the access node and transmitting the unmodulated light signals to said number of user devices, said plurality of first optical conductors additionally for injecting modulated light signals back into said access node from the user devices;
said access node further including a signal processor for generating wavelength division multiplex signals in the access node; and
at least one second optical conductor connecting said access node to the optical network for feeding said wavelength division multiplex signals from said access node into the optical network.

18. The optical network of claim 18, wherein, each of said number of user devices includes a circulator and a modulator to be connected to an information source.

19. The optical network of claim 17, wherein, each of said number of user devices includes a modulator operating in reflection mode and configured to be connected to an information source.

* * * * *